United States Patent [19]

Katayama et al.

[11] Patent Number: 4,975,786

[45] Date of Patent: Dec. 4, 1990

[54] IMAGE PROCESSING METHOD AND APPARATUS WITH ERROR DIFFUSION CAPABILITY

[75] Inventors: Akihiro Katayama, Kawasaki; Hidefumi Ohsawa, Urawa; Shinichi Ishida, Yokohama; Masahiro Sakamoto, Tokyo; Yasuyuki Shinada, Yokohama, all of Japan

[73] Assignee: Canon Kabushiki Kaisha, Tokyo, Japan

[21] Appl. No.: 289,017

[22] Filed: Dec. 23, 1988

[30] Foreign Application Priority Data

Dec. 28, 1987 [JP] Japan ................................ 62-334975
Feb. 25, 1988 [JP] Japan ................................ 63-043114
Feb. 25, 1988 [JP] Japan ................................ 63-043115

[51] Int. Cl.$^5$ .............................................. H04N 1/40
[52] U.S. Cl. ................................... 358/459; 358/457; 358/466; 382/50
[58] Field of Search ............... 358/280, 282, 283, 284, 358/454–459, 261.1, 466, 465; 382/50, 56

[56] References Cited

U.S. PATENT DOCUMENTS

| | | | |
|---|---|---|---|
| 4,258,393 | 3/1981 | Ejiri et al. | 358/80 |
| 4,274,111 | 6/1981 | Murase | 358/75 |
| 4,298,895 | 11/1981 | Arai et al. | 358/284 |
| 4,305,093 | 12/1981 | Nasu | 358/75 |
| 4,386,366 | 5/1983 | Mori | 358/465 |
| 4,389,677 | 6/1983 | Rushby et al. | 358/280 |
| 4,495,522 | 1/1985 | Matsunawa et al. | 358/280 |
| 4,517,607 | 5/1985 | Ohkouchi et al. | 358/284 |
| 4,534,059 | 8/1985 | Yamada | 358/284 |
| 4,562,486 | 12/1985 | Suzuki et al. | 358/282 |
| 4,647,972 | 3/1987 | Strehl | 358/160 |
| 4,651,287 | 3/1987 | Tsao | 358/284 |
| 4,654,721 | 3/1987 | Goertzel et al. | 358/78 |
| 4,668,995 | 5/1987 | Chen et al. | 358/282 |
| 4,675,704 | 6/1987 | Yamamoto | 358/80 |
| 4,682,215 | 7/1987 | Adachi | 358/75 |
| 4,686,579 | 8/1987 | Sakamoto | 358/282 |
| 4,821,334 | 4/1989 | Ogino et al. | 358/283 |

FOREIGN PATENT DOCUMENTS

| | | |
|---|---|---|
| 2300515 | 7/1973 | Fed. Rep. of Germany . |
| 3241365 | 5/1983 | Fed. Rep. of Germany . |
| 3311911 | 10/1984 | Fed. Rep. of Germany . |
| 1374521 | 11/1974 | United Kingdom . |

OTHER PUBLICATIONS

"Survey of Electronic Techniques for Pictorial Image Reproduction", in IEEE Transactions on Communications, vol. COM-29, Dec. 1981, pp. 1898-1925.
"On the Error Diffusion Techniques for Electronic Halftoning", in Proc. of the SIC, vol. 24, No. 3, 1983, pp. 253-258.
"Damped Error Diffusion in Binary Display", in IBM Technical Disclosure Bulletin, vol. 28, No. 3, Aug. 1985, pp. 1290-1291.
"Snow Removal-A Noise-Stripping Process for Picture Signals", in IRE Transactions on Information Theory, Feb. 1962, pp. 129-144.
R. W. Floyd and L. Steinberg, "An Adaptive Algorithm For Spatial Grey Scale", SID '75 DIGEST, pp. 36-37.

Primary Examiner—Howard W. Britton
Assistant Examiner—Kim-Yen Vu
Attorney, Agent, or Firm—Fitzpatrick, Cella, Harper & Scinto

[57] ABSTRACT

An image processing apparatus such as a digital printer or digital facsimile apparatus for half tone processing input image data has: an input device to input image data indicative of a concentration of an image; a discriminating circuit to discriminate whether the input image data is smaller than a threshold value or not; a binarizing circuit to binarize the input image data into binary data of high and low levels; and a setting circuit to set the binary output of the image data to the low (0) level irrespective of the result of the binarization by the binarizing circuit when the input image data is determined to be smaller than the threshold value. The input device includes a reading circuit to read the original image and a generator to generate image data indicative of the original image concentration. When the pixel concentration to be processed by an error diffusion method is smaller than the threshold value, the error data generated for that pixel is set to 0, with the result that particles-like noises in the high contrast portion are eliminated and the encoding efficiency in highlight portions is improved. Thus, a high quality image of excellent resolution and gradations can be transmitted at a high speed.

32 Claims, 13 Drawing Sheets

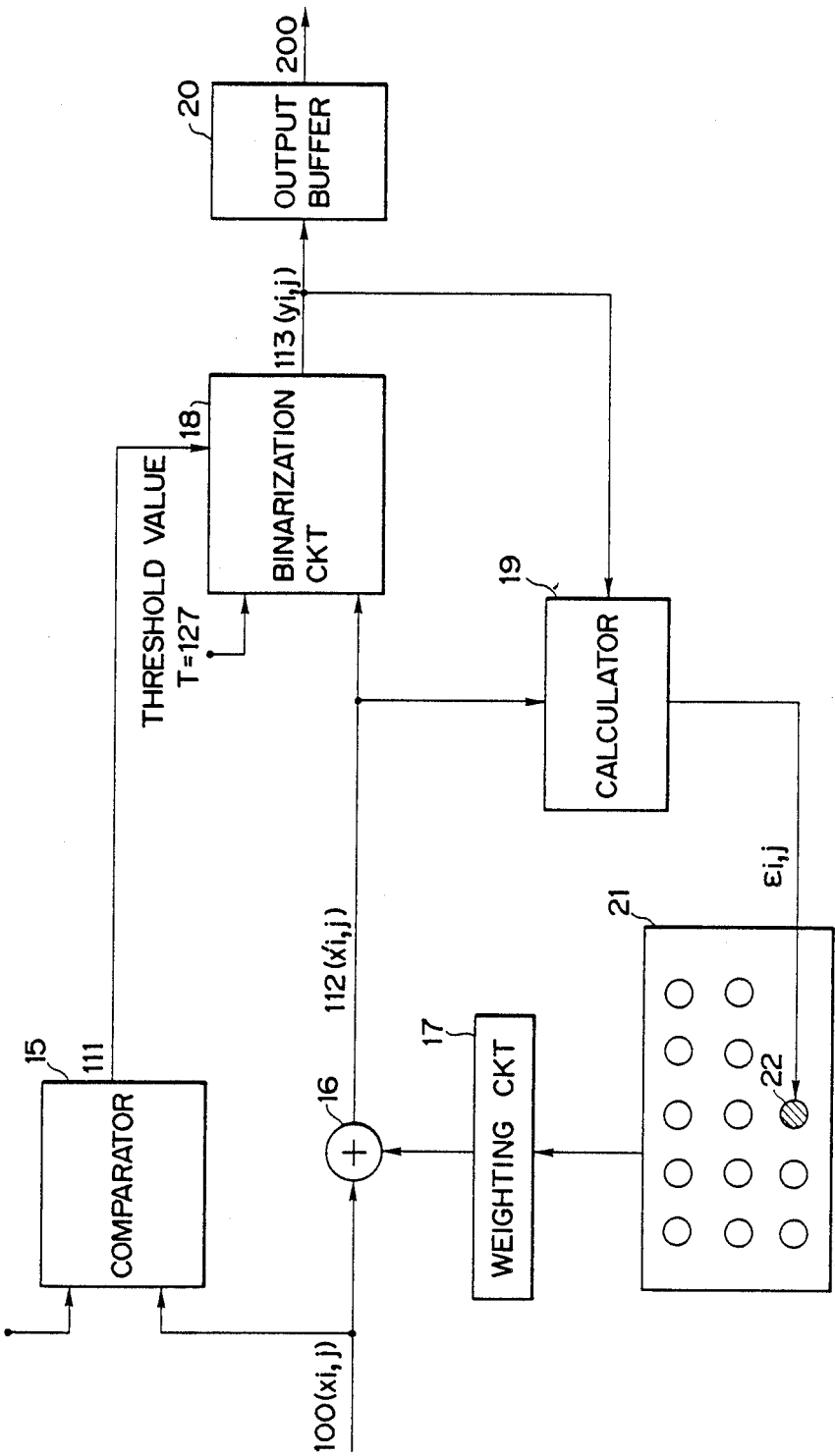

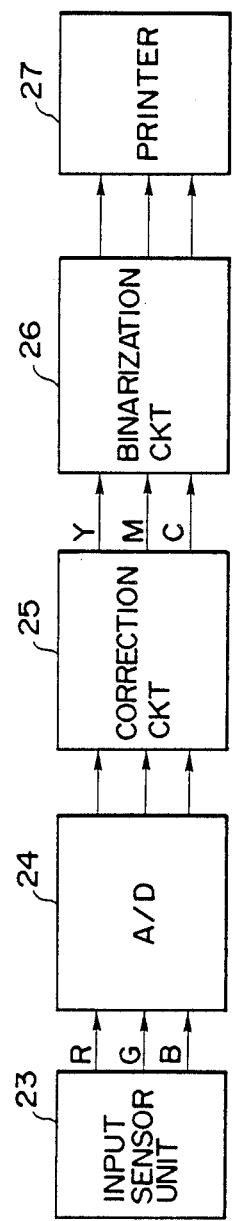

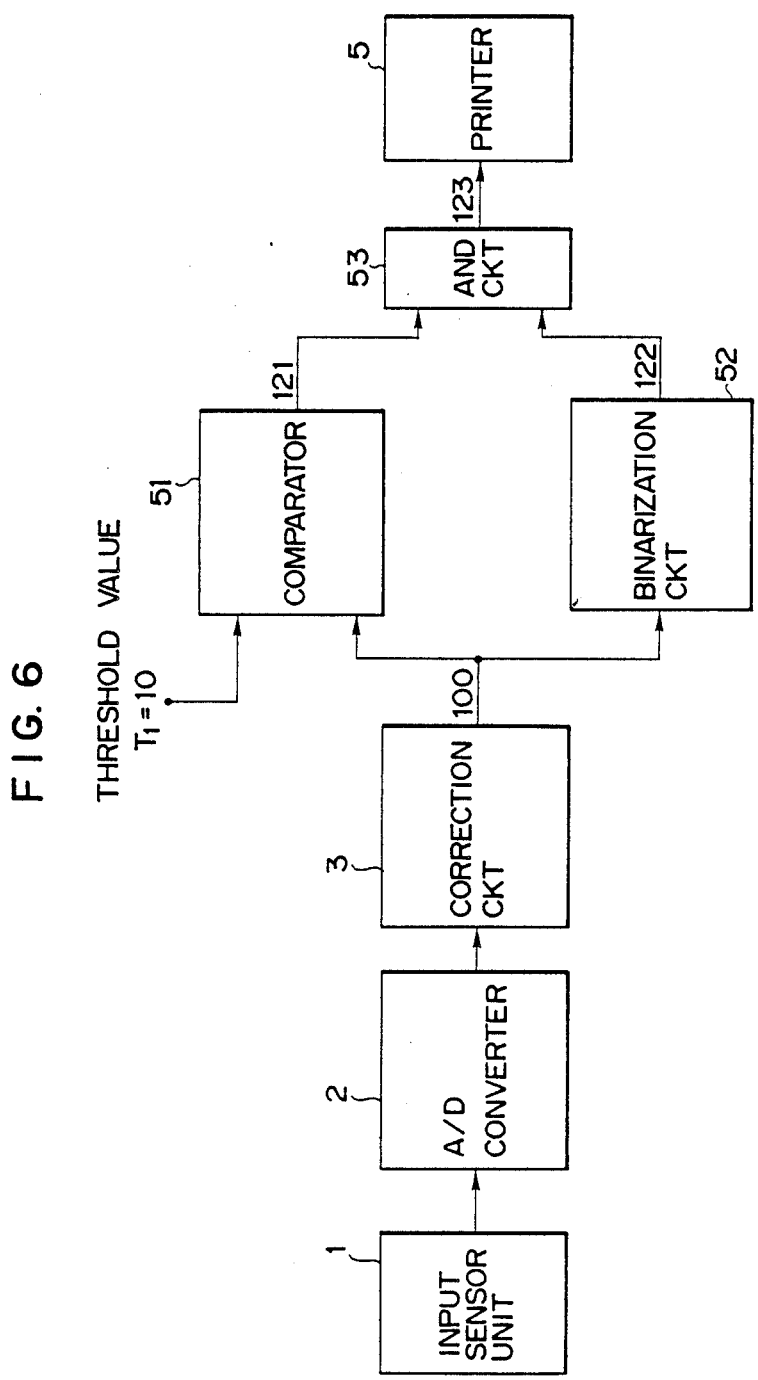

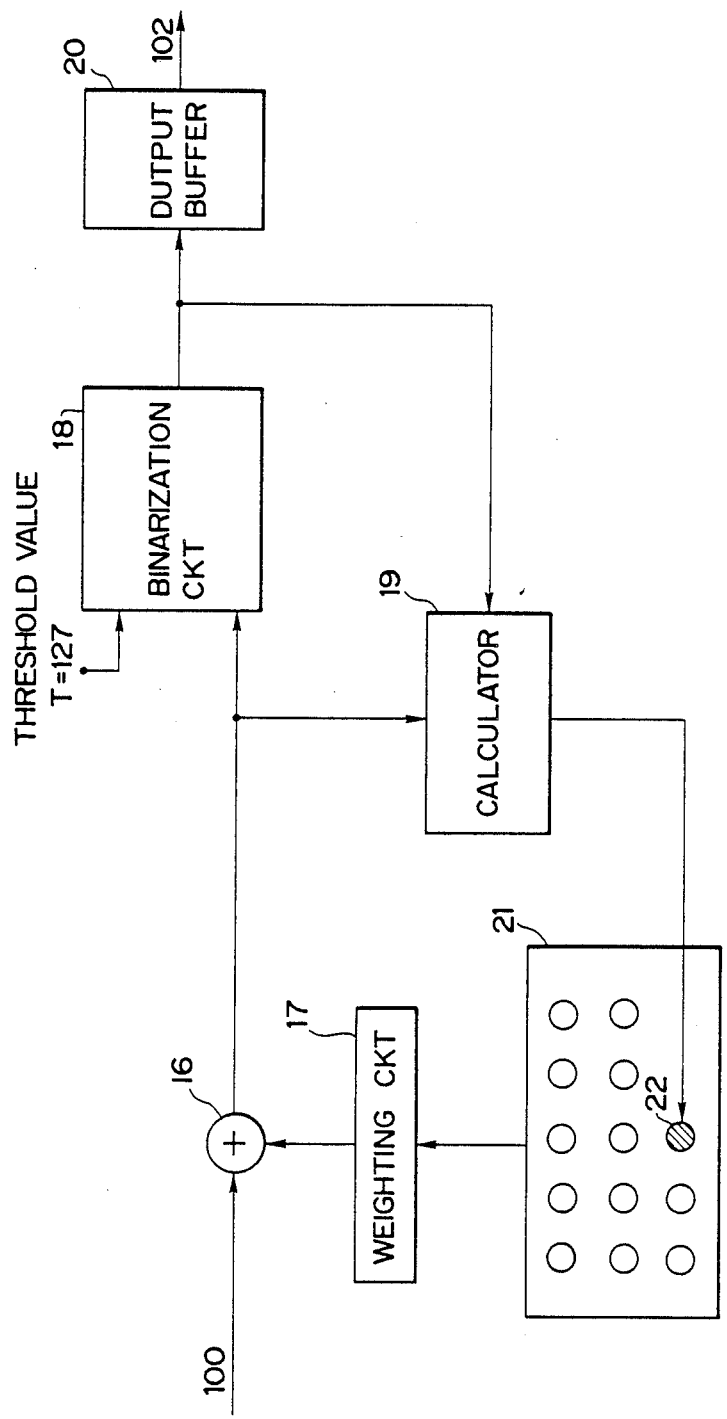

| INPUT | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| OUTPUT | 63 | 52 | 46 | 42 | 38 | 35 | 33 | 31 | 29 | 28 | 26 | 25 | 24 | 23 | 21 | 21 | 20 | 19 | 18 | 17 |
| | 20 | 21 | 22 | 23 | 24 | 25 | 26 | 27 | 28 | 29 | 30 | 31 | 32 | 33 | 34 | 35 | 36 | 37 | 38 | 39 |
| | 16 | 16 | 15 | 14 | 14 | 13 | 13 | 12 | 11 | 11 | 10 | 10 | 10 | 9 | 9 | 8 | 8 | 7 | 7 | 7 |
| | 40 | 41 | 42 | 43 | 44 | 45 | 46 | 47 | 48 | 49 | 50 | 51 | 52 | 53 | 54 | 55 | 56 | 57 | 58 | 59 |
| | 6 | 6 | 6 | 5 | 5 | 5 | 4 | 4 | 4 | 3 | 3 | 3 | 2 | 2 | 2 | 1 | 1 | 0 | 0 | 0 |
| | 60 | 61 | 62 | 63 | | | | | | | | | | | | | | | | |
| | 0 | 0 | 0 | 0 | | | | | | | | | | | | | | | | |

F I G. 16

| INPUT | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| OUTPUT | 63 | 52 | 46 | 42 | 38 | 35 | 33 | 31 | 29 | 28 | 26 | 25 | 24 | 23 | 21 | 21 | 20 | 19 | 18 | 17 |

| 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|
| 16 | 16 | 15 | 14 | 14 | 13 | 13 | 12 | 11 | 11 | 10 | 10 | 10 | 9 | 9 | 8 | 8 | 7 | 7 | 7 |

| 40 | 41 | 42 | 43 | 44 | 45 | 46 | 47 | 48 | 49 | 50 | 51 | 52 | 53 | 54 | 55 | 56 | 57 | 58 | 59 |
|---|---|---|---|---|---|---|---|---|---|---|---|---|---|---|---|---|---|---|---|
| 6 | 6 | 6 | 5 | 5 | 5 | 4 | 4 | 4 | 3 | 3 | 3 | 2 | 2 | 2 | 2 | 1 | 1 | 1 | 1 |

| 60 | 61 | 62 | 63 |
|---|---|---|---|
| 0 | 0 | 0 | 0 |

IMAGE PROCESSING METHOD AND APPARATUS WITH ERROR DIFFUSION CAPABILITY

BACKGROUND OF THE INVENTION

1. Field of the Invention

The present invention relates to an image processing apparatus such as a digital printer, digital facsimile apparatus, or the like which deals with an image as a digital signal and to an image processing method which is used in such image processing apparatus. More particularly, the invention relates to an image processing method and apparatus for half-tone processing image data.

2. Related Background Art

In general, digital copying apparatus of a type in which an image is sampled by a CCD sensor or the like, the digitized data is output from a digital printer such as a laser beam printer or the like, and an image is reproduced are used widely in place of a conventional analog copying apparatus, as a result of the development of digital equipment.

Such a digital copying apparatus generally uses a method of reproducing gradations by a dither method or a concentration pattern method in order to reproduce half-tones. However, such methods have drawbacks such as the following:

(1) In the case where an original is a dotted image a result of the use of certain printing methods or the like, a periodic fringe pattern which does not exist in the original appears in the copied image (2) In the case where an original includes diagrams, characters, and the like, the edges become uneven due to the dither processing, so that the picture quality deteriorates.

The phenomenon of (1) is called a moire phenomenon and occurs by the following causes.

(A) The beats by the dotted original and the input sampling.

(B) The beats by the dotted original and the dither threshold value matrix.

Particularly, in the case of the phenomenon (B), generally, when the threshold values of the dither are arranged in a dot concentration manner, an output image also has a pseudo-dotted structure, causing beats with the input dotted original Thus, the moire phenomenon occurs.

On the other hand, an error diffusion method has been known as a binarization method which has recently been highlighted. According to the error diffusion method, the difference between an image concentration of an original and the output image concentration is calculated for every pixel and the error component as the result of the calculation is diffused by adding special weights to the peripheral pixels. Such a method has been published in the article by R. W. Floyd and L. Steinberg, "An Adaptive Algorithm for Spatial Grey Scale", SID 75 Digest.

On the other hand, a method called a least mean error method has also been known. This method is considered to be substantially equivalent to the error diffusion method.

In the case of binarizing by using such a method, since there is no periodicity in the processing of errors, no moire occurs for the dotted image and the resolution is better than that by the dither method or the like. However, there is a drawback that a unique fringe pattern is generated in the highlight portions of the image. To eliminate the foregoing drawback of the error diffusion method, the assignee of the present invention has already filed U.S. patent application Ser. Nos.: 145,593, 192,601, 203,880, and 284,603, and U.S. Pat No. 4,876,610 and 4,878,125.

On the other hand, according to the error diffusion method, dots are printed on the background of a character portion, causing the deterioration of the picture quality (particularly, in the character portion).

On the other hand, when the error diffusion method is used in a white portion of a low image concentration, the data of low concentrations are gradually accumulated as errors. When the total error amount exceeds a threshold value, the errors appear as a dot, so that the picture quality in the white portion is deteriorated.

The causes of the appearance of the dot will be described with respect to the case where the concentration data is expressed by six bits (0 to 63).

According to the above error diffusion method, for instance, in the case where, for instance, luminance data read by a reading apparatus is digitized into six-bit concentration data 0 (white) to 63 (black) for every pixel and the digitized concentration data is binarized by the error diffusion method, for example, if the data of concentration level "1" is uniformly distributed, the difference between the output data 0 and the concentration data 1 in the case of binarizing the data of the concentration level 1 is sequentially added to the peripheral pixels, so that there is a drawback that when the added pixel value exceeds the threshold value for binarization, a black dot is output.

In other words, in spite of the fact that the portion in which the concentration level 1 is uniformly distributed is seen as a white image on the whole by human eyes, particle-like noises are generated in the white portion because of the occurrence of the black dots. The image quality is deteriorated due to the particle-like noises in the high contrast portion.

On the other hand, even if an entirely white image is read, if the level of the video signal from the CCD is smaller than the dynamic range of an A/D converter, a numerical value of a certain degree is output from the A/D converter even in the case of the whole white portion, so that the particle-like noises are also generated in a manner similar to the foregoing case and the image quality is deteriorated.

On the other hand, in the case where data is binarized and encoded and transmitted as in the case of the facsimile apparatus, particle-like noises (black dots) are generated irrespective of the whole white image, so that there is a drawback such that the encoding efficiency also deteriorates.

SUMMARY OF THE INVENTION

It is an object of the present invention to eliminate the drawbacks of the conventional techniques mentioned above.

Another object of the invention is to provide an image processing method and apparatus in which the generation of dots in the background of a character portion and in a white portion is prevented and a high quality reproduction image can be obtained.

Still another object of the invention is to provide an image processing apparatus in which by half-tone processing by using an error diffusion method, an image of a high picture quality having excellent resolution and gradations can be transmitted.

Still another object of the invention is to provide an image processing apparatus which can improve an encoding efficiency and can transmit a good image at a high speed.

Still another object of the invention is to provide image processing method and apparatus which can eliminate particle-like noises in a highlight portion which are generated by the binarization process in an error diffusion method and can also improve an encoding efficiency.

Still another object of the invention is to provide a facsimile apparatus which can transmit a good half-tone image by binarizing read image data by using an error diffusion method and transmitting.

According to one aspect of the invention is provided an image processing apparatus in which, when input image data is smaller than a predetermined value, a binarized output is set to a low level irrespective of the result of the binarization of the binarizing means.

According to another aspect of the invention is provided an image processing apparatus in which when image data is binarized by an error diffusion method, if the image data is determined to be white data, error data is not distributed to the peripheral image data.

Still another object of the invention is provided image processing method and apparatus in which, when luminance data is converted into concentration data, it is converted so as to improve an encoding efficiency, and the converted concentration data is binarized by an error diffusion method and the resultant binary data is encoded.

The above and other objects, features and advantages of the present invention will become apparent from the following detailed description of the preferred embodiments and the appended claims with reference to the accompanying drawings.

BRIEF DESCRIPTION OF THE DRAWINGS

FIGS. 2 and 4 are diagrams showing the details of a binarization circuit in FIG. 1;

FIG. 3 is a diagram showing an example of weight coefficients;

FIG. 5 is a diagram showing an application of the embodiment of FIG. 1 to a color image processing apparatus;

FIG. 6 is a diagram showing another embodiment of the present invention;

FIG. 7 is a diagram showing the details of the binarization circuit in FIG. 6;

FIG. 11 is a diagram showing a ROM in which data of a luminance-concentration data conversion table is written;

FIGS. 12 and 16 are diagrams showing luminance-concentration data conversion tables;

DETAILED DESCRIPTION OF THE PREFERRED EMBODIMENTS

Figure 1:
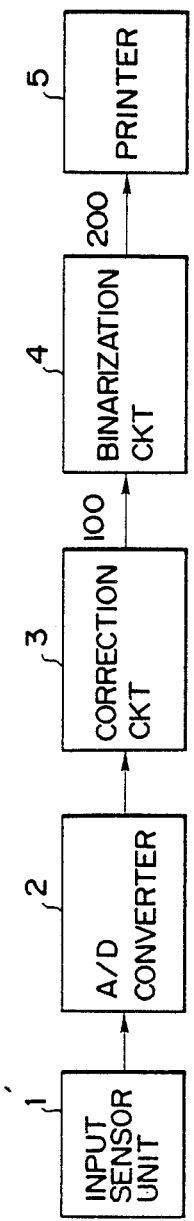
FIG. 1 is a block diagram showing an embodiment of the present invention.

FIG. 1 is a block diagram showing an embodiment of the resent invention. Image data is read by an input sensor unit 1 having a photoelectric converting device such as a CCD or the like and a drive system to scan it. The read image data is sequentially transferred to an A/D converter 2. For instance, the A/D converter 2 converts data of each pixel to digital data of eight bits. Thus, image data is digitized into the data having gradations of 256 levels. In a correction circuit 3, a shading correction and the like are executed by digital arithmetic operating processes in order to correct a sensitivity variation of the sensor and an illuminance variation due to an irradiating light source. Next, a corrected signal 100 is input to a binarization circuit 4 and is binarized by an error diffusion method. The binarized data is input as a signal 200 to a printer 5 and output as an image.

Figure 2:
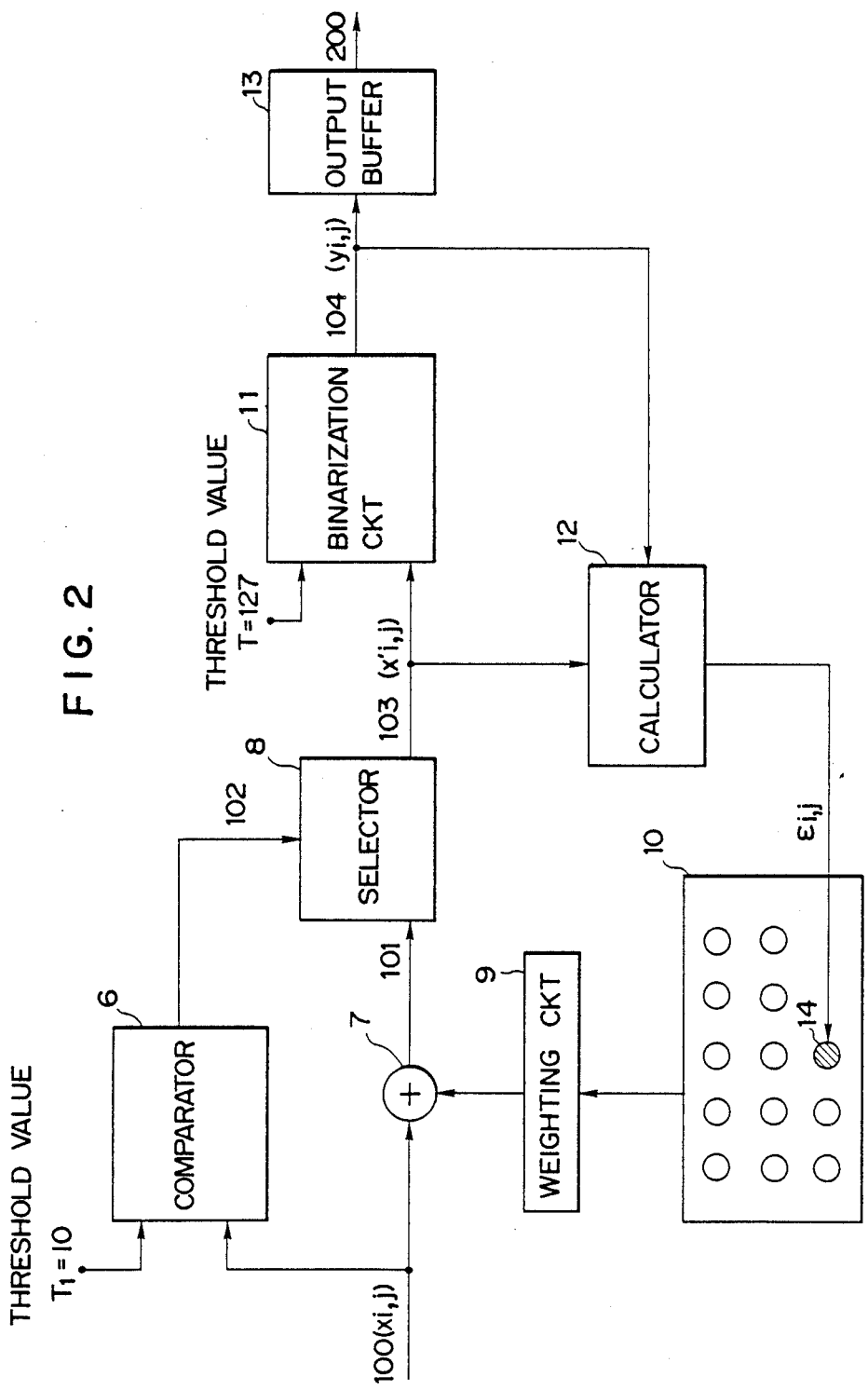

FIG. 2 is a block diagram showing the details of the binarization circuit 4. The corrected data 100 ($x_{ij}$) is input to a comparator 6 and an adder 7. A weight coefficient $a_{ij}$ designated by a weighting circuit 9 is normalized and multiplexed to an error $\epsilon_{ij}$ (difference between correction data $x_{ij}'$ which has previously been generated and output data $y_{ij}$) stored in an error buffer memory 10 and the resultant data is added to the data 100 by the adder 7. The added data is output as a signal 101 from the adder 7. Such processes can be expressed by the following equation, $$x_{ij}' = x_{ij} + \left( \sum_{k1} a_{k1}\epsilon_{i+k,j+1} \right) / \sum_{k1} a_{k1}$$

FIG. 3 shows an example of weight coefficients $a_{ij}$. In FIG. 3, * denotes the position of the pixel which is at present being processed.

The corrected data 100 ($x_{ij}$) is also input to the comparator 6 and compared with a threshold value $T_1$ ($T_1 = 10$ in the example). If the data 100 is smaller than the threshold value $T_1$, a "0" level signal is output. If it is larger than $T_1$, a "1" level signal is output. The "0" or "1" signal is output as a signal 102. The signal 101 is input to a selector 8. When the signal 102 is at the "0" level, output data 103 is set to "0". If the signal 102 is at the "1" level, the output data 103 is set to the value of the signal 101. By providing the comparator 6 and selector 8 as mentioned above, an image data in the portion of low concentration (the background in a character section or the like) is forcedly set to "0". In this portion, no dot appears. Thus, the appearance of dots in the background portion of characters or in the white portion can be prevented.

The error corrected data 103 ($x_{ij}'$) is then compared with a threshold value T ($D_{max}=255$, T $=127$ in the example) by a binarization circuit 11 and data 104 ($y_{ij}$) is output from the binarization circuit 11. The data $y_{ij}$ is the binarized data of $D_{max}$ or 0. The binarized data $y_{ij}$ is stored in an output buffer 13, and subsequently is output therefrom as signal 200.

On the other hand, a calculator 12 calculates the difference $\epsilon_{ij}$ between the correction data 103 ($x_{ij}'$) and the output data 104 ($y_{ij}$). The result is stored in a memory area in the error buffer memory 10 corresponding to a pixel position 14. By repeating the operations mentioned above, the binarization is executed on the basis of the error diffusion method.

In the embodiment, when the image data 100 is smaller than $T_1$ (=10), the image data 101 added with the error data is forcedly set to 0. Therefore, the output image does not preserve the concentration of the original.

The case of preserving the concentration of an original will now be described.

FIG. 4 is a block diagram showing the case where a part of the binarization circuit 4 in FIG. 2 has been modified. The corrected data 100 ($x_{ij}$) is input to a comparator 15 and an adder 16. The weight coefficient $\alpha_{ij}$ designated by a weighting circuit 17 is normalized and multiplexed to the error $\epsilon_{ij}$ (difference between the correction data $x_{ij}'$ which has previously been generated and the output data $y_{ij}$) stored in an error buffer memory 21 and the resultant data is added to the data 100 by the adder 16. The added data is output as a signal 112 from the adder 16. The above processes can be expressed by the following equation;

$$x_{ij}' = x_{ij} + \left( \sum_{k1} \alpha_{k1}\epsilon_{i+k,j+1} \right) / \sum_{k1} \alpha_{k1}$$

The corrected data 100 ($x_{ij}$) is input to the comparator 15 and compared with the threshold value $T_1$ ($T_1=10$ in the example). If the data 100 is smaller than the threshold value $T_1$, a "0" level signal is output. If it is larger than $T_1$, a "1" level signal is output as a signal 111. The signal 111 is input to a binarization circuit 18. When the signal 111 is at the "0" level, a "0" level signal is output as a signal 113. If the signal 111 is at the "1" level, the result obtained by binarizing the signal 112 by the threshold value T (=127) is output as the signal 113 ($y_{ij}$). The binarized data is stored into an output buffer 20 and data 200 is output therefrom.

On the other hand, a calculator 19 calculates the difference $\epsilon_{ij}$ between the correction data 112 ($x_{ij}'$) and the output data 113 ($y_{ij}$). The result is stored into a memory area in the error buffer memory 21 corresponding to a pixel position 22. By repeating the foregoing operations, the binarization is executed on the basis of the error diffusion method.

By forcedly setting the portion of a low concentration to "0" by the foregoing construction, the appearance of dots in the background portion of a character portion and in the white portion can be suppressed. On the other hand, since the concentration of an original is preserved as an output image, the error data in the background portion is added to the pixel in the edge portion of an image, so that the edges can be substantially emphasized. Consequently, the sharpness of an image is enhanced and the quality of characters can be also improved.

FIG. 5 is a block diagram showing a case where the invention is applied to a color image. Three color-separated red, green, and blue signals are output from a color image input unit 23 and converted into 8-bit digital signals by an A/D converter 24, one for every color. In a correction circuit 25, a shading correction, a complementary color conversion from RGB signals to YMC signals, a masking process, and the like are executed, so that yellow (Y), magenta (M), and cyan (C) signals are output.

The Y, M, and C signals are input to a binarization circuit 26, by which the background process of the character portion and the binarization are executed. The binarization circuit 26 can be realized by providing the binarization circuit 4 in FIG. 1 for three colors of Y, M, and C. The binarized data is output as a color image by a printer 27.

The case where a part of the circuit arrangement has been changed although substantially the same processes as those in FIG. 4 are executed, will now be described with reference to FIGS. 6 and 7. In this case, an AND circuit is provided, the binarization based on the error diffusion method is performed and the logical AND of a predetermined threshold value and the result of the comparison is calculated.

In FIG. 6, the parts and components which execute the same processes as those in FIG. 1 are designated by the same reference numerals and their descriptions are omitted The corrected signal 100 is input to a comparator 51 and a binarization circuit 52. The comparator 51 compares the input data 100 with the threshold value $T_1$ ($T_1=10$ in the example). When the input data 100 is larger than the threshold value $T_1$, "255" is output as a signal 121. If it is smaller than $T_1$, "0" is output as the signal 121. In the binarization circuit 52, the binarization based on the error diffusion method or the like is executed for the input data 100. Binarized data 122 is input to an AND circuit 53 and the AND of the data 122 and signal 121 is calculated. The AND here denotes that "255" is output when both of the signals 121 and 122 are set to "255" (in the case of eight bits) and that "0" is output in the other cases.

Consequently, the appearance of dots in the portion of an extremely low concentration such as background portion of the character portion or white portion can be prevented and the picture quality in the character portion is improved The data 123 output from the AND circuit 53 is transferred to the printer 5 and output as an image.

In the embodiment, the input data has been set to eight bits. However, the processes can be also similarly executed in the case where the input data is set to 5 to 6 bits as in the facsimile apparatus.

On the other hand, by changing the threshold value $T_1$ in the comparator 51, the background (other than the character portion) of an image can be also erased.

FIG. 7 is a diagram showing the binarization circuit 52 in FIG. 6. The description of the binarization circuit 52 is substantially the same as that in the case where the comparator 15 in FIG. 4 is omitted. Therefore, it is omitted here.

In the embodiment mentioned above, when the concentration data of an image is smaller than the threshold value $T_1$ (=10), the image concentration data 103 is set to "0" as shown in FIG. 2, thereby completely suppressing the appearance of dots. However, by setting concentration data 103 of an image to "1" or "2" and outputting, a predetermined number of dots can be also allowed to appear.

As described above, according to the embodiment, the dots appearing in the background portion of the character portion or white portion can be erased or reduced and a reproduction image of a high quality can be obtained.

An example in which the invention is applied to a facsimile apparatus such that an image is read and binarized and the binarized data is encoded and transmitted will now be described as the second embodiment.

Figure 8:
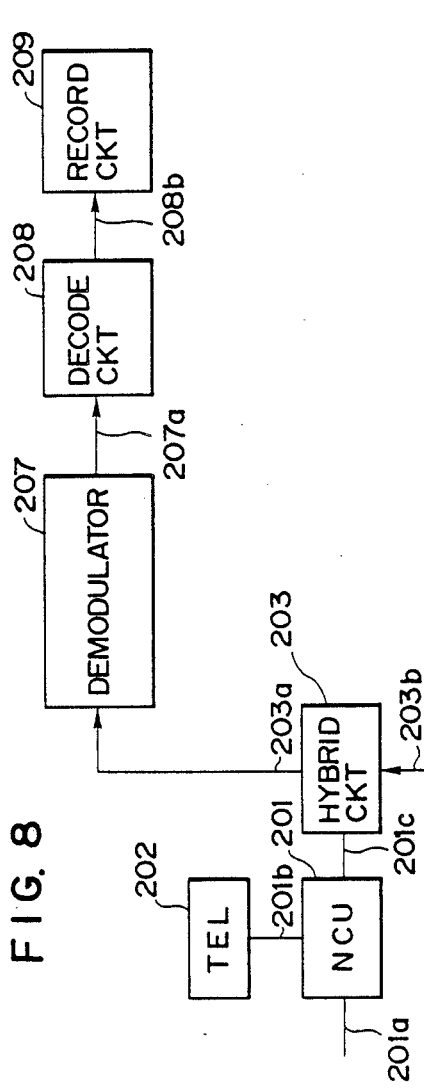
FIG. 8 is a block diagram of a facsimile apparatus to which the invention is applied.

FIG. 8 is a block diagram of a facsimile apparatus to which the invention is applied.

In FIG. 8, reference numeral 201 denotes a network control unit (NCU) for connecting a telephone line 201a, a telephone 202, and a hybrid circuit 203 on the side of a data communicating apparatus and for holding a control loop. Reference numeral 202 denotes the telephone and 203 indicates the hybrid circuit to separate a signal of the transmission system and a signal of the reception system. In the hybrid circuit 203, a transmission signal from a signal line 203b is transmitted to the telephone line 201a through a signal line 201c and NCU 201 and a signal sent from a partner side is output to a signal line 203a through the NCU 201 and signal line 201c.

Reference numeral 206 denotes a read and binarization circuit for sequentially reading an image signal of one line in the main scanning direction from a transmission original and for producing a signal train indicative of binary values of white and black on the basis of the error diffusion method. The read and binarization circuit comprises: an image pickup device such as a CCD (charge coupled device) or the like; an optical system; and a binarization circuit for converting read luminance data into concentration data and for binarizing by the error diffusion method. The binarization circuit will be described in detail hereinlater. The binarized signal train of white and black is output to a signal line 206a. Reference numeral 205 denotes an encode circuit for receiving the binarization data which was output to the signal line 206a and binarized by the error diffusion method and for outputting to a signal line 205a the MH (Modified Huffman) encoded or MR (Modified READ) encoded data.

Reference numeral 204 denotes a modulator to perform the modulation based on the well-known CCITT Recommendation V27 ter (differential phase modulation) or V29 (orthogonal modulation). The modulator 204 receives the signal from the signal line 205a and modulates and outputs the modulated data to the signal line 203b.

Reference numeral 207 denotes a demodulator to perform the demodulation on the basis of the well-known CCITT recommendation V27 ter or V29. The demodulator 207 receives the signal from the signal line 203a and demodulates and outputs the demodulated data to a signal line 207a.

Reference numeral 208 denotes a decode circuit for receiving the demodulated data from the signal line 207a and outputting the decoded (MH or MR decoded) data to a signal line 208b.

Reference numeral 209 indicates a record circuit for receiving the signal output to the signal line 208b and sequentially recording every line.

An MH encoding system will now be described as an example in the encode circuit 205 in FIG. 8.

Figure 9:
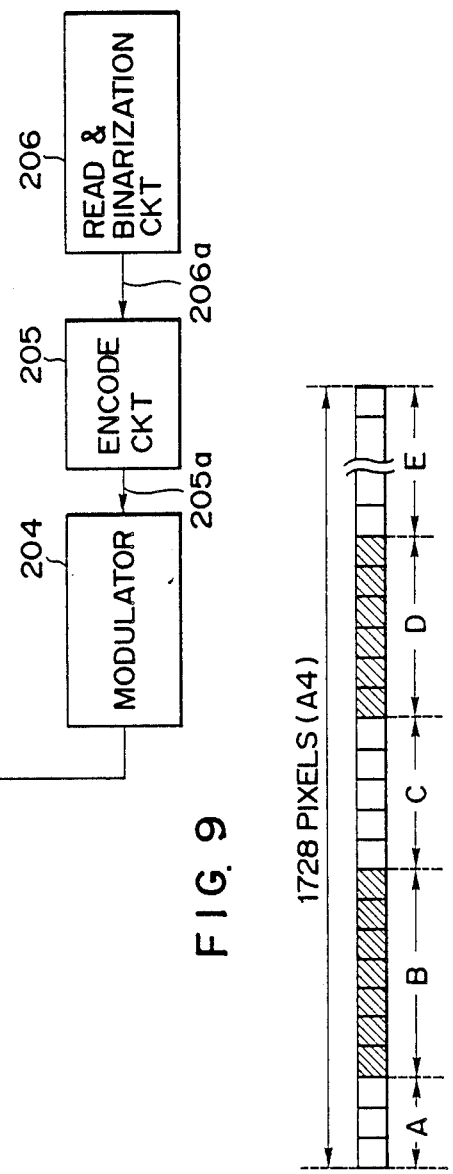
FIG. 9 is a diagram showing an example of a signal train of one scanning line.

The signal train of one scanning line from the read and binarization circuit 206 can be alternately divided into the white portion and black portion as shown in FIG. 9. In FIG. 9, A, C, and E indicate the white portions and B and D represent the black portions. The number of pixels in each of the white and black portions is called a run length.

The color (white or black) of A to E and the run length are encoded and the image data is compressed and, thereafter, the compressed data is sent to the modulator 204. When encoding, each run is encoded by the Huffman code. The Huffman code consists of a terminating code and a make-up code.

According to the Huffman code, a compression ratio improves as the run of the same color is longer. A pattern of the worst encoding efficiency, that is, the lowest compression ratio, occurs when white and black portions alternately appear.

Figure 10:
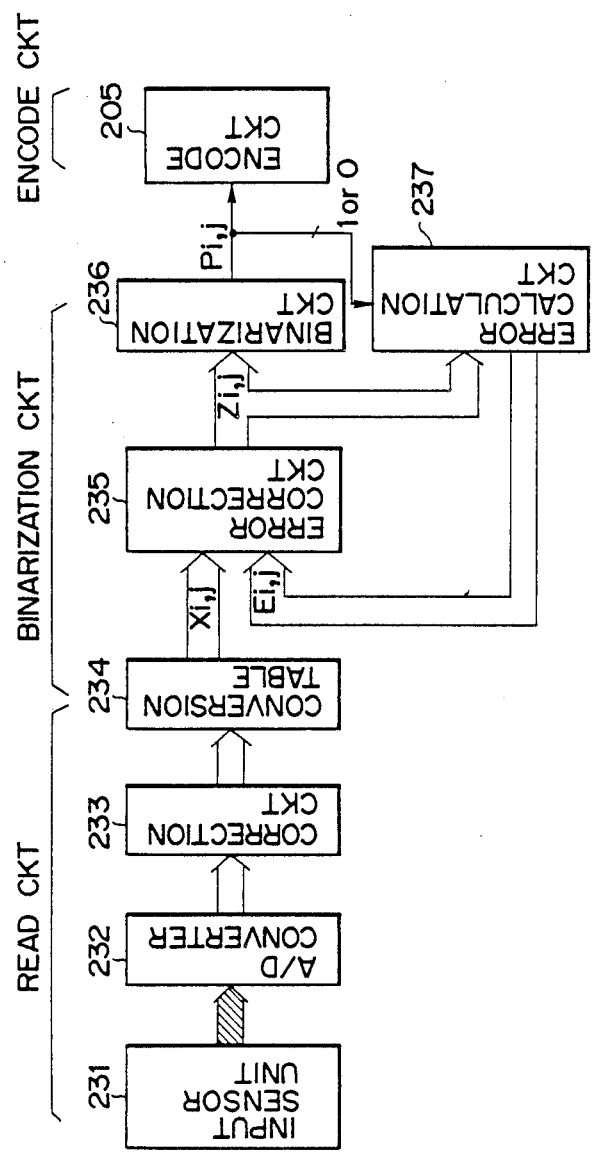
FIGS. 10, 15, and 17 are diagrams showing the details of the read and binarization circuit in FIG. 8.

FIG. 10 is a diagram showing the details of the read and binarization circuit 26 in FIG. 8. The binarizing process by the error diffusion method will now be described hereinbelow with reference to FIG. 10.

An input sensor unit 231 comprises a photoelectric converting device such as a CCD or the like and a drive unit to scan it and reads and scans an original The image data read by the input sensor unit 231 is sent to an A/D converter 232. The A/D converter 232 converts the image data of each pixel into the digital data of six bits, that is, digitizes into the data having gradations of 64 levels. In a correction circuit 233, the shading distortion correction is executed to correct a sensitivity variation of the CCD and an illuminance variation of a light source. In this case, luminance data $\phi$ (black) ← 63 (white) respectively is used and the luminance data is input to a conversion table 234 and converted into the concentration data.

Figures 11, 12:
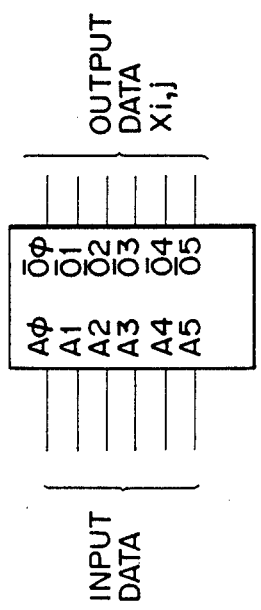

FIG. 11 shows an example in which an ROM is used as the conversion table. The content in which the luminance data is used as input data and the concentration data is used as output data is written in the ROM in FIG. 11. FIG. 12 shows an input/output correspondence table of the conversion table.

That is, the luminance data from the correction circuit 233 is input to addresses $A\phi$ to $A5$ in the ROM in FIG. 11. The concentration data based on the input/output correspondence table in FIG. 16 is output as output data to an error correction circuit 235 from $O_0$ to $O_5$ in FIG. 11. In the correspondence table in FIG. 12, the input data values (luminance data) of 57 or more (white) are all set such that the output data values (concentration data) are set to $\phi$. The output data $X_{i,j}$ is the concentration data $\phi$ (white) ← 63 (black).

That is, with respect to the luminance data of 57 or more, in the case of performing the binarization by the error diffusion method by converting the concentration data into 0, an increase amount of the error data which is distributed to the peripheral pixels is also 0 in the portion of the concentration data of 0. Therefore, by adding the error data, the value of the concentration data of a certain pixel exceeds the threshold value, so that the output of black dots can be prevented.

The binarizing process which is executed in the error correction circuit 235 and subsequent circuits will now be described. In the error correction circuit 235, error data $E_{i,j}$ calculated by an error calculation circuit 237 is added to the output data $X_{i,j}$ of the conversion table. That is, assuming that the output data of the error correction circuit 235 is $Z_{i,j}$, it can be expressed by the following equation:

$$Z_{i,j} = X_{i,j} + E_{i,j}$$

The output data $Z_{i,j}$ is sent to a binarization circuit 236 and compared with a threshold value TH and converted into a binary value. That is, when $Z_{i,j} > TH$, $P_{i,j} = 63$;
when $Z_{i,j} < TH$, $P_{i,j} = 0$
where $P_{i,j}$: binary data.

The data $Z_{i,j}$ is also sent to the error calculation circuit 237 and the error is calculated. Namely, when $Z_{i,j}$ is larger than the threshold value TH, $$\alpha_{i,j} = (63 - Z_{i,j})/10$$

When $Z_{i,j}$ is smaller than the threshold value TH, $$\alpha_{i,j} = (Z_{i,j}/10)$$

Figure 13:
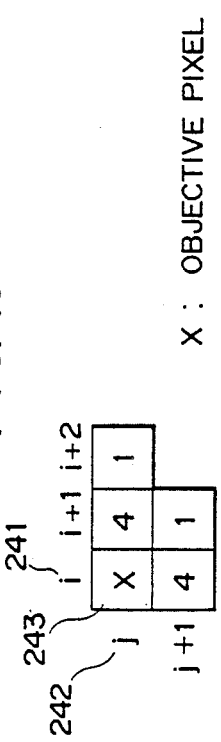
FIG. 13 is a diagram showing an example of an error diffusion matrix.

Further, $\alpha_{i,j}$ is weighted by an error matrix shown in FIG. 13 and is output as the error value $E_{i,j}$ and is returned to the error correction circuit 235.

In FIG. 13, reference numeral 243 denotes an objective pixel, i in 241 indicates a main scanning direction, and j in 242 represents a sub-scanning direction.

The error values generated when the binarization was executed for the objective pixel 243 are diffused to (i+1, j), (i+2, j), (i, j+1), and (i+1, j+1).

The binarization data $P_{i,j}$ is sent to the encode circuit 205 and encoded by the MH or MR encoding system on the basis of the binarization data $P_{i,j}$. The encoding process in the encode circuit 205 can be efficiently executed in the highlight portion. That is, this is because by setting the concentration to 0 for the luminance data of a predetermined value or more, the occurrence of black dots in the highlight portion after completion of the binarization by the error diffusion method is prevented.

The encode circuit 205 has line buffers of at least one line for encoding.

Figure 14:
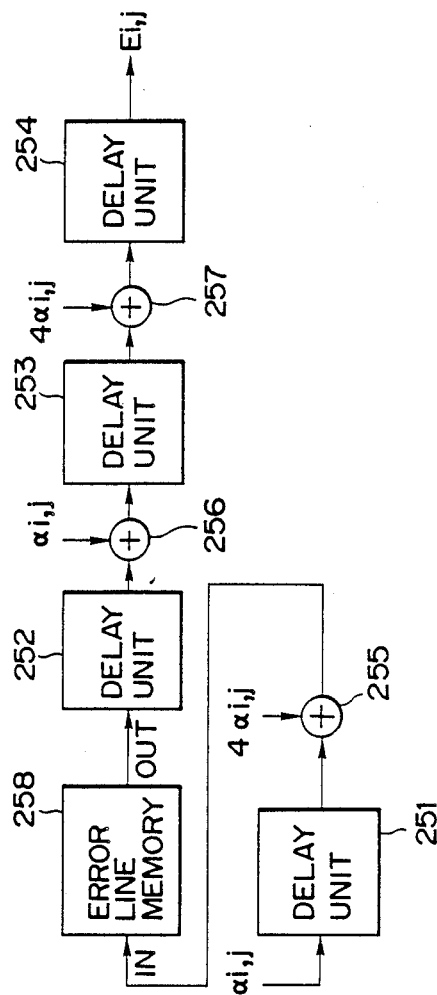
FIG. 14 is a circuit diagram for explaining processes which are executed in an error calculation circuit.

The processes which are executed in the error calculation circuit 237 will now be described with reference to a circuit in FIG. 14.

Reference numerals 251, 252, 253, and 254 denote delay units which generally consist of latch circuits. Each of the delay sections 251 to 254 delays by a time corresponding to one pixel.

Reference numerals 255, 256, and 257 indicate adders each for performing the addition or subtraction of the error data and error data to calculate the error in the error matrix in FIG. 13. Reference numeral 258 denotes an error line memory using, e.g., a FIFO (first-in first-out) memory. The error line memory 258 stores the result of the calculation of the errors of one line and delays by a time corresponding to one line.

The operation of FIG. 14 will now be described The error data $\alpha_{i,j}$ calculated by the error calculation circuit 237 in FIG. 10 is distributed to four peripheral pixels in accordance with the error matrix in FIG. 13. First, after the error data $\alpha_{i,j}$ is delayed by a time of one pixel by the delay unit 251, it is added to $4 \times \alpha_{i,j}$ by the adder 253. An output of the adder 255 is stored into the error line memory 258. After the error data stored is delayed by a time of one line, it is further delayed by a time of one pixel by the delay unit 252 and added to $\alpha_{i,j}$ by the adder 256. Similarly, the error data generated by the other pixels are added through the delay units and adder (253, 257, and 254) and the error value $E_{i,j}$ is output.

That is, in the case of binarizing the data of the objective pixel, the error value $E_{i,j}$ generated in the pixel which has already been processed is added in accordance with the error matrix.

As described above, according to this embodiment, the luminance-concentration conversion table is set before the binarizing process based on the error diffusion method and the luminance data of a predetermined value or more is set to the concentration data 0, so that the increase amount of the errors in the error diffusion method can be set to 0. The particle like noises in the highlight portion can be certainly eliminated at a high speed.

On the other hand, by eliminating the particle-like noises in the highlight portion, the encoding process in the facsimile apparatus can be also efficiently executed.

As described above, according to the facsimile apparatus of the embodiment, an image of a high picture quality having excellent resolution and gradations can be transmitted at a high speed without largely deteriorating the encoding efficiency.

On the other hand, according to the embodiment, since the processes by the error diffusion method are executed by the apparatus on the transmission side, an image of a high picture quality can be reproduced on the reception side by merely decoding the encoded data and recording by an ordinary facsimile apparatus which has been widespread.

Figure 15:
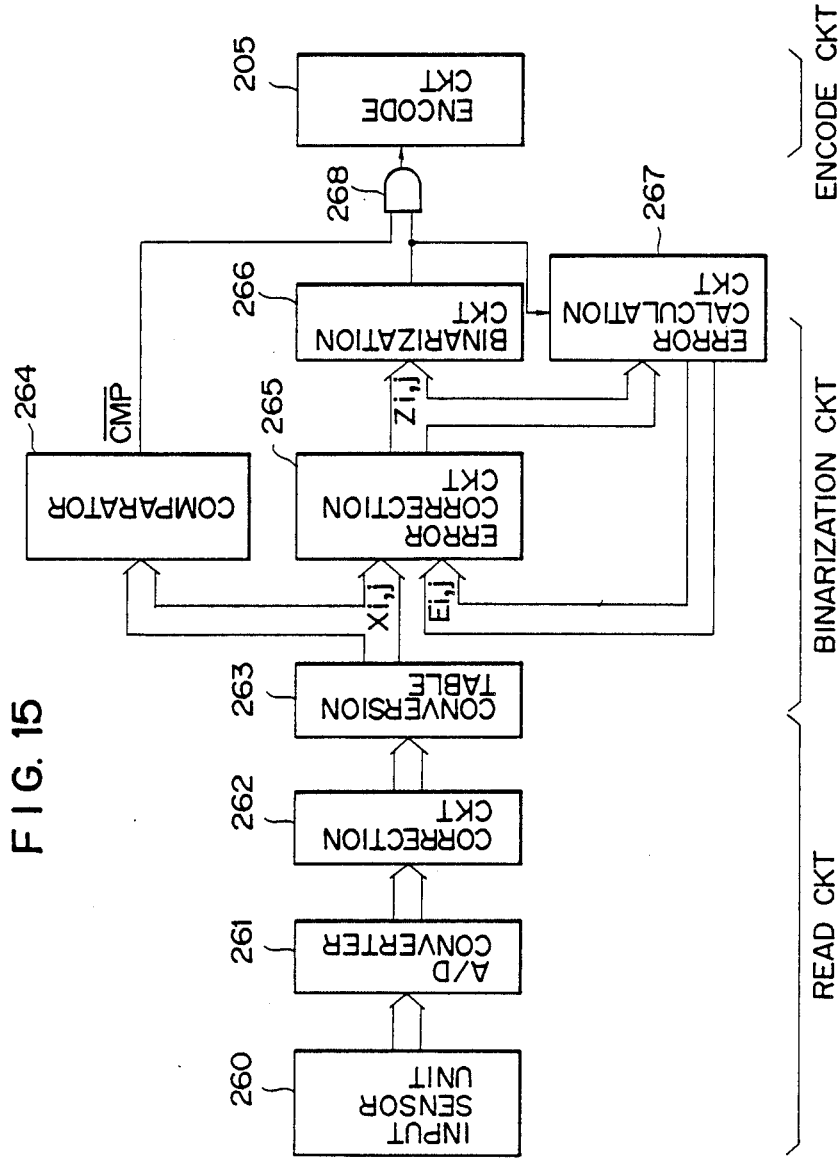

FIG. 15 is a hardware arrangement diagram showing another embodiment of the read and binarization circuit in FIG. 8.

The binarizing process by the error diffusion method will now be described hereinbelow with reference to FIG. 15.

Reference numeral 260 denotes an input sensor unit to read an original; 261 indicates an A/D converter; 262 a correction circuit to perform the shading correction and the like; 263 a conversion table to convert the luminance data into the concentration data; 264 a comparator; 265 an error correction circuit to add an error value to the concentration of an original pixel; 266 a binarization circuit to convert the multi value data into the binary data; 267 an error calculation circuit to calculate errors; 268 an AND circuit; and 205 the same as the encode circuit 205 in FIG. 8.

This embodiment will now be described hereinbelow with reference to FIG. 15.

The input sensor unit 260 comprises a photoelectric converting device such as a CCD or the like and a drive unit to scan it and reads and scans an original. The image data read by the input sensor unit 260 is sent to the A/D converter 261. The A/D converter 261 converts the image data of each pixel into the digital data of, e.g., six bits, thereby digitizing into the data having the gradations of 64 levels. In a correction circuit 262, the shading distortion correction is executed to correct a sensitivity variation of the CCD and an illuminance variation of a light source. The data here is the luminance data 0 (black) to 63 (white), respectively. The luminance data is input to the conversion table 263 and converted into the concentration data.

The ROM of the conversion table has the same constitution as that shown in FIG. 11 but the content of the conversion table differs That is, the content such that the luminance data is set to the input data and the concentration data is set to the output data is written in the ROM. FIG. 16 shows an input/output correspondence table of the conversion table. Namely, the luminance data from the correction circuit 262 is input to addresses A0 to A5 in the ROM. The concentration data based on the input/output correspondence table in FIG. 16 is output as the output data to the error correction circuit 265 from $O_0$ to $O_5$.

The binarizing process which is executed in the error correction circuit 265 and subsequent circuits will now be described.

In the error correction circuit 265, the error data $E_{i,j}$ calculated by the error calculation circuit 267 is added to the output data $X_{i,j}$ of the conversion table 263. Suffixes (i,j) denote the ith pixel data of the jth line. Assuming that the output data of the error correction circuit is set to $Z_{i,j}$, it can be expressed by the following equation;

$$Z_{i,j} = X_{i,j} + E_{i,j}$$

The output data $Z_{i,j}$ is sent to the binarization circuit 266 and compared with the threshold value TH and converted into a binary value. That is,
when $Z_{i,j} \geq TH$, $P_{i,j} = .63$
when $Z_{i,j} < TH$, $P_{i,j} = 0$
where, $P_{i,j}$ binary data The $Z_{i,j}$ is also sent to the error calculation circuit 267 and the errors are calculated.

That is, when the $Z_{i,j}$ is larger than the threshold value TH, $$\alpha_{i,j} = (63 - Z_{i,j})/10$$

When the $Z_{i,j}$ is smaller than the TH, $$\alpha_{i,j} = (Z_{i,j}/10)$$

Further, $\alpha_{i,j}$ is weighted by the error matrix shown in FIG. 13 as mentioned above and is returned as the error value $E_{i,j}$ to the error correction circuit 265. The output $Z_{i,j}$ from the error correction circuit 265 is compared with the threshold value TH by the binarization circuit 266 and the binary signal of 1 or 0 is sent to the AND circuit 268. Since the error calculation circuit 267 has the same constitution as that in FIG. 14, its detailed description is omitted here.

On the other hand, $X_{i,j}$ is compared with a preset value by the comparator 264. The preset value is set to a threshold value of, e.g., 3 or 4 at which when $X_{i,j}$ is the preset value or less, the pixel is regarded as a whole white pixel. If $X_{i,j}$ is the threshold value or less, a signal of $\overline{CMP} = 0$ is output from the comparator 264 to the AND circuit 268. If the output of the comparator 264 is 0, a "0" level signal is output to the encode circuit 205 irrespective of the output signal of the binarization circuit 266. If the output of the comparator is 1, the AND circuit outputs the binary data from the binarization circuit 266 to the encode circuit 205.

The encode circuit 205 performs the encoding process by the MH or MR system on the basis of the output from the AND circuit 268. The encoding process by the encode circuit 205 can be efficiently performed in the highlight portion. That is, by binarizing such that the concentration data of a predetermined concentration or less is converted into 0 irrespective of the binary output of the error diffusion method, even if the concentration of the pixel is actually low, it is possible to prevent that the concentration exceeds the threshold value due to the error data. The generation of the particle-like noises can be prevented in the highlight portion.

The encode circuit 205 has line buffers which can store the binary data of at least one line from the AND circuit 268 for encoding.

As described above, according to the embodiment, if the pixel concentration to be processed by the error diffusion method is a predetermined value or less, by outputting the pixel as white independently of the binary output in the error diffusion method, the particle-like noises in the high contrast portion can be eliminated and there is an effect such that the image quality can be improved. Moreover, since the particle-like noises are eliminated, the encoding efficiency can be also improved.

Figure 17:
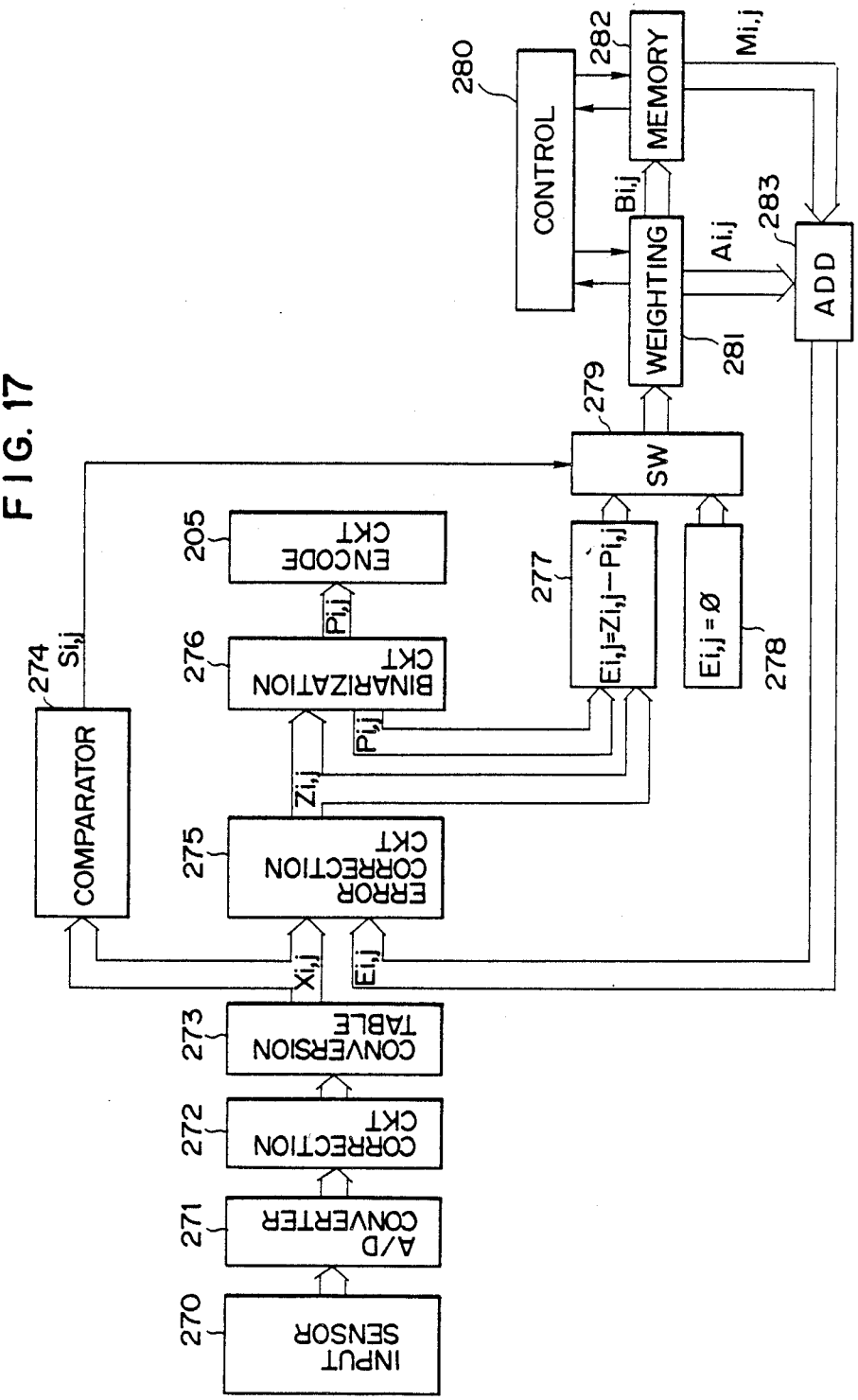

Another embodiment of the read and binarization circuit in FIG. 8 will now be described with reference to FIG. 17.

Reference numeral 270 denotes an input sensor unit to read an original; 271 indicates an A/D converter; 272 a correction circuit to perform the shading distortion correction and the like; 273 a conversion table to convert the luminance data into the concentration data; 274 a comparator; 275 an error correction circuit to add an error value to the concentration of the original pixel; 276 a binarization circuit to convert the multi value data into the binary data on the basis of a threshold value; 205 the encode circuit; 277 a subtraction circuit to calculate error data; 278 a circuit to output 0 as an error; 279 a switch to select either one of outputs of the circuits 277 and 278; 280 a control circuit to control a memory 282 and the like; 281 a weighting circuit; 282 the memory; and 283 an adding circuit.

The input sensor section 270 comprises a photoelectric converting device such as a CCD or the like and a drive unit to drive it and reads and scans an original. Image data read by the input sensor unit 270 is sent to the A/D converter 271. The A/D converter 271 converts the image data of each pixel into the digital data of, e.g., six bits, thereby digitizing into the data having the gradations of 64 levels. In the correction circuit 272, shading distortion correction is executed to correct a sensitivity variation of the CCD and an illuminance variation of a light source. The data in this case is the luminance data 0 (black) to 63 (white) respectively; and the luminance data is input to the conversion table 104 to convert the luminance data into the concentration data. The values in the conversion table are the same as those shown in FIG. 16. The ROM in FIG. 11 is used in the converting process. That is, the luminance data is input to addresses A0 to A5 in the ROM in FIG. 11 and the output data based on the conversion table in FIG. 16 is output from the outputs $O_0$ to $O_5$ of the ROM.

The output data $X_{i,j}$ is the concentration data 0 (white) to 63 (black) respectively.

In the error correction circuit 275, the output data $E_{i,j}$ of the adding circuit 283 is added to the output data $X_{i,j}$ of the conversion table 273 and the data $Z_{i,j}$ is output. Suffixes (i,j) represent the ith pixel data of the jth line. That is, the output data $Z_{i,j}$ of the error correction circuit can be expressed by the following equation;

$$Z_{i,j} = X_{i,j} + E_{i,j}$$

$Z_{i,j}$ is sent to the binarization circuit 276 and compared with the threshold value TH and converted into the binary data $P_{i,j}$. That is,
when $Z_{i,j} \geq TH$, $P_{i,j} = 63$, and
when $Z_{i,j} < TH$, $P_{i,j} = 0$ Next, to calculate errors, the output data $P_{i,j}$ of the binarization circuit is subtracted from the output data $Z_{i,j}$ of the error correction circuit by the subtraction circuit 277. That is, assuming that the output data of the subtraction circuit 277 is set to $E_{i,j}$, $$E_{i,j} = Z_{i,j} - P_{i,j}$$

$E_{i,j}$ is input to the switch 279. The output of the circuit 278 is also input to the switch 279. The circuit 278 always outputs the 0 data.

The switch 279 selects one of the two input data by a control signal $S_{i,j}$ and outputs. The control signal $S_{i,j}$ is output from the comparator 274. When the concentration data $X_{i,j}$ is smaller than a set value BTH, that is, when it is brighter than the set value BTH, $S_{i,j}$ is set to the high (H) level. When $X_{i,j}$ is larger than the set value BTH, namely, when it is darker than the set value BTH, $S_{i,j}$ is set to the low (L) level. When $S_{i,j}$ is at the H level, the switch 279 selects the output signal of the circuit 278 as output data. If $S_{i,j}$ is at the L level, the switch 279 selects the output data of the circuit 277. This is because if the input data has a brightness of the threshold value BTH or less, it is determined that the human eyes feel the image as white. Therefore, in such a high contrast portion, the errors are forcedly set to 0, thereby preventing the generation of a black dot.

The output data $E_{i,j}$ (errors) of the switch 279 is weighted by the weighting circuit 281 and the errors are spatially diffused.

The weighting circuit 281 adds weights in accordance with the error matrix shown in FIG. 13. According to the error matrix, since the errors are diffused to the jth line and (j+1)th line, the data $B_{i,j}$ to be diffused to the (j+1)th line is stored into the memory 282.

When the process progresses to the pixel on the next line, data is read out of the memory 282. The errors $A_{i,j}$ and $M_{i,j}$ on the currently processing line which were calculated by the weighting circuit 281 are added by the adding circuit 283 and the result is returned as an error value $E_{i,j}$ to the error correction circuit.

On the other hand, the output signal $P_{i,j}$ of the binarization circuit 276 is sent to the encode circuit 205 and is encoded by the MH or MR encoding system in accordance with the value of the output signal $P_{i,j}$.

The encoding process in the encode circuit 205 can be efficiently performed in the highlight portion. That is, since the diffusion errors in the error diffusion method are set to 0 for the concentration data of a predetermined concentration or less, even if the concentration of the pixel is actually low, it is possible to prevent that the concentration exceeds the threshold value due to the error data. The generation of the particle-like noises in the highlight portion can be prevented.

The encode circuit 205 has line buffers which can store the binary data from the AND circuit 268 or binarization circuit 276 in FIG. 15 of at least one line in order to encode.

As mentioned above, according to the embodiment, when the pixel concentration to be processed by the error diffusion method is a predetermined value or less, by setting the error data generated for that pixel to 0, the particle-like noises in the high contrast portion can be eliminated and there is an advantage such that the image quality is improved. Moreover, by eliminating the particle-like noises, the encoding efficiency can be also improved.

As described above, according to the facsimile apparatus of the embodiment, since the image is half-tone processed by using the error diffusion method, the image of a high picture quality having excellent resolution and gradations can be transmitted. Further, the encoding process in the highlight portion of an image can be efficiently performed and a good image can be transmitted at a high speed.

Although the embodiment has been described with respect to the case where the image data is binarized by the error diffusion method (least mean error method) as a digitizing method, the invention can be also similarly applied to the case of converting the image data to multi-values by the error diffusion method.

Although the present invention has been described with respect to the preferred embodiments, the invention is not limited to the foregoing embodiments but many modifications and variations are possible within the spirit and scope of the appended claims of the invention.

What is claimed is:

1. An image processing apparatus comprising:
   input means for inputting image data indicative of a concentration of an image;
   discriminating means for discriminating whether the image data input by said input means is smaller than a predetermined value or not;
   binarizing means for binarizing the image data input by said input means into binary data of high and low levels, said binarizing means executing binarization while error data representing an error between a concentration of the input image and a concentration of an output image after the binarization is diffused to peripheral image data; and
   setting means for setting a binary output of the image data irrespective of the result of the binarization performed by said binarizing means when it is determined by said discriminating means that the input image data is smaller than the predetermined value.

2. An apparatus according to claim 1, wherein said input means comprises reading means for reading an image of an original and means for generating the image data indicative of the concentration of the original image.

3. An apparatus according to claim 1, wherein said discriminating means discriminates whether the image data is smaller than the predetermined value or not, to discriminate whether the image data is the data in a white portion or not.

4. An apparatus according to claim 1, wherein when it is determined by said discriminating means that the input image data is smaller than the predetermined value, said binarizing means sets the error between the input image concentration and the output image concentration to 0.

5. An apparatus according to claim 1, further comprising recording means for recording an image on the basis of the data of the low and high levels binarized by said binarizing means.

6. An apparatus according to claim 1, further comprising encoding means for encoding the data of the low and high levels binarized by said binarizing means and transmitting means for transmitting the data encoded by said encoding means 7. An image processing apparatus comprising:
   input means for inputting image data indicative of a concentration of an image;
   discriminating means for discriminating whether the image data input by said input means is smaller than a predetermined value or not;
   setting means for setting a value of the input image data into data lower than said value when it is determined by said discriminating means that the image data is smaller than the predetermined value; and
   quantizing means for quantizing the data set by said setting means, said quantizing means executing quantization while error data representing an error between a concentration of the input image and a concentration of an output image after the quantization is diffused to peripheral image data.

8. An apparatus according to claim 7, wherein said input means comprising reading means for reading an image of an original and means for generating image data indicative of a concentration of the original image.

9. An apparatus according to claim 7, wherein said discriminating means discriminates whether the image data is smaller than the predetermined value or not, to discriminate whether the image data is in the data in a white portion or not.

10. An apparatus according to claim 7, wherein said setting means sets the value of the input image data to 0.

11. An apparatus according to claim 7, wherein said quantizing means quantizes the data by an error diffusion method.

12. An apparatus according to claim 7, wherein when it is determined by said discriminating means that the input image data is larger than the predetermined value, said quantizing means quantizes the input image data.

13. An apparatus according to claim 12, further comprising recording means for recording the image on the basis of the data quantized by said quantizing means.

14. An image processing apparatus comprising:
input means for inputting image data indicative of a concentration of an image;
binarizing means for binarizing the image data, said binarizing means executing binarization while error data representing an error between a concentration of the input image and a concentration of an output image after the binarization is diffused to peripheral image data;
discriminating means for discriminating whether said image data is white data or not; and
control means for controlling said binarizing means so as not to diffuse the error data representing the error between the input image concentration and the output image concentration to the peripheral image data when it is determined by said discriminating means that the image data is white data.

15. An apparatus according to claim 14, wherein said input means comprises reading means for reading an image of an original and means for generating the image data indicative of the concentration of the original image.

16. An apparatus according to claim 14, wherein said discriminating means discriminates whether the image data is smaller than the predetermined value or not, to discriminate whether the image data is white data or not.

17. An apparatus according to claim 14, further comprising recording means for recording an image on the basis of the data binarized by said binarizing means.

18. An apparatus according to claim 14, further comprising encoding means for encoding the data binarized by said binarizing means and transmitting means for transmitting the data encoded by said encoding means.

19. An image processing apparatus according to claim 14, wherein said discriminating means discriminates the image data input into a read only memory as white data when the input image data has a level equal to or lower than a predetermined value.

20. An image processing apparatus according to claim 14, wherein said control means, when it is discriminated that the image data is white data, controls said binarizing means such that said binarizing means converts a value of the image data into 0 and then binarizes the data of 0 level.

21. An image processing apparatus comprising:

reading means for reading an image of an original and generating luminance data;
converting means for converting the luminance data read by said reading means into concentration data; and
qauntizing means for quantizing the concentration data obtained by said converting means,
wherein said quantizing means quantizes the concentration data by an error diffusion method and said converting means converts the concentration data into 0 for the luminance data of a predetermined value or more to prevent appearance of dots after quantization.

22. An apparatus according to claim 21, wherein said converting means comprises a read only memory having therein a conversion table to convert the luminance data into the concentration data, and said read only memory outputs the concentration data by using the luminance data as input addresses.

23. An apparatus according to claim 21, further comprising encoding means for encoding the data binarized by said binarizing means and transmitting means for transmitting the data encoded by said encoding means.

24. An image processing apparatus comprising:
reading means for reading an image of an original and generating luminance data;
converting means for converting the luminance data read by said reading means into concentration data;
binarizing means for binarizing the concentration data obtained by said converting means by an error diffusion method; and
encoding means for encoding the binary data binarized by said binarizing means,
wherein said converting means converts the luminance data into the concentration data so as to improve the encoding efficiency in the encoding means.

25. An apparatus according to claim 24, wherein said converting means comprises a read only memory having therein a conversion table to convert the luminance data into the concentration data, and said read only memory outputs the concentration data by using the luminance data as input addresses.

26. An apparatus according to claim 25, wherein said ROM has therein a conversion table to convert the concentration data into 0 for the luminance data of a predetermined value or more.

27. An image processing method comprising the steps of:
reading an image of an original and generating luminance data;
converting the luminance data read in said reading step into concentration data;
binarizing the concentration data obtained in said converting step by an error diffusion method; and
encoding the binary data in said binarizing step,
wherein, in said converting step, the luminance data is converted into the concentration data so as to improve an encoding efficiency in said encoding step.

28. A method according to claim 27, wherein said converting step is performed using a read only memory having therein a conversion table to convert the luminance data into the concentration data, and the read only memory outputs the concentration data by using the luminance data as input addresses.

29. A method according to claim 28, wherein the read only memory has therein a conversion table to convert the concentration data into 0 for the luminance data of a predetermined value or more.

30. A facsimile apparatus comprising:
   read means for reading an original image to generate image data;
   binarization means for binarizing the image data read by said read means, said binarization means correcting an error between the input image data and output binarization data by diffusing error data generated at binarization of the image data to peripheral image data;
   encode means for encoding the binarization data binarized by said binarization means;
   transmission means for transmitting the data encoded by said encode means; and
   means for improving encode efficiency of the binarization data binarized by said binarization means.

31. An apparatus according to claim 30, wherein said read means comprises means for converting luminance data obtained by reading the original image into concentration data and outputting the converted concentration data.

32. An apparatus according to claim 31, wherein said improving means improves the encode efficiency by converting, in the luminance data, data whose level is higher than a predetermined value into concentration data of a level 0.

* * * * *

UNITED STATES PATENT AND TRADEMARK OFFICE
CERTIFICATE OF CORRECTION

PATENT NO. : 4,975,786

DATED : December 4, 1990

INVENTOR(S) : Akihiro Katayama, et al

It is certified that error appears in the above-identified patent and that said Letters Patent is hereby corrected as shown below:

Title Page:

IN [57] ABSTRACT

Line 2, "half tone" should read --half-tone--.
Line 19, "particles-like" should read --particle-like--.

SHEET 6 OF 13

FIG. 7, "DUTPUT" should read --OUTPUT--.

COLUMN 1

Line 29, "image a" should read --image as a--.
Line 39, "beats by" should read --beats caused by--.
Line 41, "beats by" should read --beats caused by--.
Line 47, "original Thus," should read --original. Thus,--.
Line 67, "that by" should read --that obtained by--.

COLUMN 2

Line 24, "data 0 (white) to 63 (black)" should read
--data {0 (white) to 63 (black)}--.

COLUMN 4

Line 11, "image" should read --the image-- and "the"
should be deleted.
Line 31, "equation," should read --equation:--.
Line 50, "an image data in the" should read
--the data in an image--.

UNITED STATES PATENT AND TRADEMARK OFFICE
CERTIFICATE OF CORRECTION

PATENT NO. : 4,975,786

DATED : December 4, 1990

INVENTOR(S) : Akihiro Katayama, et al

It is certified that error appears in the above-identified patent and that said Letters Patent is hereby corrected as shown below:

COLUMN 5

Line 21, "equation;" should read --equation:--.

COLUMN 6

Line 7, "changed" should read --changed,--.

COLUMN 8

Line 14, "original The" should read --original.  The--
Line 22, "luminance data $\phi$ (black) $\leftarrow$ 63" should read --luminance data {$\phi$ (black) $\leftrightarrow$ 63 (white)}--.
Line 23, "(white) respectively" should be deleted.
Line 42, "data $\phi$ (white) $\leftarrow$ 63 (black)." should read --data {$\phi$ (white) $\leftrightarrow$ 63 (black)}.--.
Line 66, "$P_{ij}=63$;" should read --$P_{i,j}=63$; and--.

COLUMN 9

Line 45, "described The" should read --described.  The--.
Line 50, "adder 253." should read --adder 255.--.
Line 68, "particle like" should read --particle-like--.

COLUMN 10

Line 31, "multi value" should read --multi-value--.
Line 48, "data 0 (black) to 63 (white), respectively." should read --data {0 (black) to 63 (white)}.--.

UNITED STATES PATENT AND TRADEMARK OFFICE
CERTIFICATE OF CORRECTION

PATENT NO. : 4,975,786

DATED : December 4, 1990

INVENTOR(S) : Akihiro Katayama, et al

It is certified that error appears in the above-identified patent and that said Letters Patent is hereby corrected as shown below:

COLUMN 11

Line 3, "equation;" should read --equation:--.
    Line 10, "$P_{ij}=.63$" should read --$P_{i,j}=63$; and--.
    Line 12, "$P_{ij}$ binary data" should read --$P_i$, j: binary data--.

COLUMN 12

Line 11, "multi value" should read --multi-value--.
    Line 30, "luminance data 0 (black) to 63 (white) respectively," should read --luminance data {0 (black) to 63 (white)},--.
    Line 39, "data 0" should read --data {0--.
    Line 40, "(white) to 63 (black) respectively." should read --(white) to 63 (black)}.--.
    Line 46, "equation;" should read --equation:--.

COLUMN 14

Line 22, "data irrespective" should read --data to the low level irrespective--.
    Line 37, "wherein when" should read --wherein, when--.

COLUMN 15

Line 2, "comprising" should read --comprises--.
    Line 8, "in" (first occurrence) should be deleted.
    Line 15, "wherein when" should read --wherein, when--.

UNITED STATES PATENT AND TRADEMARK OFFICE
CERTIFICATE OF CORRECTION

PATENT NO. : 4,975,786

DATED : December 4, 1990

INVENTOR(S) : Akihiro Katayama, et al

It is certified that error appears in the above-identified patent and that said Letters Patent is hereby corrected as shown below:

COLUMN 16

Line 6, "qauntizing" should read --quantizing--.
Line 21, "binarized" should read --quantized--.
Line 22, "binarizing" should read --quantizing--.
Line 56, "data in" should read --data binarized in--.

Signed and Sealed this

Seventeenth Day of November, 1992

Attest:

DOUGLAS B. COMER

Attesting Officer

Acting Commissioner of Patents and Trademarks